United States Patent
Priisalu et al.

(10) Patent No.: US 12,206,792 B2
(45) Date of Patent: Jan. 21, 2025

(54) DIGITAL SIGNATURE SYSTEM USING SCALABLE SERVERS

(71) Applicant: Planetway Corporation, San Jose, CA (US)

(72) Inventors: Jaan Priisalu, Tallinn (EE); Ahto Buldas, Tallinn (EE); Mart Saarepera, Tallinn (EE)

(73) Assignee: Planetway Corporation, San Jose, CA (US)

( * ) Notice: Subject to any disclaimer, the term of this patent is extended or adjusted under 35 U.S.C. 154(b) by 76 days.

(21) Appl. No.: 17/793,147

(22) PCT Filed: Jan. 15, 2020

(86) PCT No.: PCT/US2020/013712
§ 371 (c)(1),
(2) Date: Jul. 15, 2022

(87) PCT Pub. No.: WO2021/145874
PCT Pub. Date: Jul. 22, 2021

(65) Prior Publication Data
US 2023/0344643 A1    Oct. 26, 2023

(51) Int. Cl.
*H04L 9/32* (2006.01)
*H04L 9/08* (2006.01)

(52) U.S. Cl.
CPC ............ *H04L 9/3247* (2013.01); *H04L 9/085* (2013.01); *H04L 9/0866* (2013.01)

(58) Field of Classification Search
CPC ..... H04L 9/3247; H04L 9/085; H04L 9/0866; H04L 2209/46; H04L 9/3255;
(Continued)

(56) References Cited

U.S. PATENT DOCUMENTS

| 5,825,880 A | 10/1998 | Sudia et al. |
| 6,996,723 B1 * | 2/2006 | Kyojima ............... H04L 9/0822 713/193 |

(Continued)

OTHER PUBLICATIONS

Vincent et al., "A key agreement authentication protocol using an improved parallel Pollard rho for electronic payment system." The Journal of Supercomputing, Nov. 2017.
(Continued)

*Primary Examiner* — Anh Nguyen
(74) *Attorney, Agent, or Firm* — James P. Muraff; McDonald Hopkins LLC

(57) ABSTRACT

Methods and systems are disclosed for a digital signature system using scalable servers. The system includes scalable frontend servers to communicate with applications servers and scalable backend servers to communicate with remote security devices. When a user, and their remote security device(s), is registered with the system, the remote security device(s) is/are assigned to a backend server. A total public key is generated by cryptographically embedding the unique identifier of the assigned backend server into a combined public key associated with the remote security device(s). When a signature request including the total public key is received at the frontend server, the unique identifier is extracted and the signature request is forwarded to the backend server that corresponds with the unique identifier.

15 Claims, 10 Drawing Sheets

(58) Field of Classification Search
CPC ... H04L 63/12; H04L 2209/12; H04L 9/3252;
H04L 9/3249; H04L 9/30; H04L 9/14;
H04L 9/08; H04L 9/3236
See application file for complete search history.

(56) References Cited

U.S. PATENT DOCUMENTS

| | | |
|---|---|---|
| 9,106,482 B1 | 8/2015 | Bapat et al. |
| 9,191,214 B2 | 11/2015 | Hernandez et al. |
| 2006/0136727 A1* | 6/2006 | Voss ................. H04L 63/12 713/175 |
| 2011/0194694 A1 | 8/2011 | Struik |
| 2013/0097420 A1 | 4/2013 | Zaverucha |
| 2016/0365981 A1* | 12/2016 | Medvinsky ............ G06F 21/57 |

OTHER PUBLICATIONS

Yang et al., "Enabling use of single password over multiple servers in two-server model." International Conference on Computer and Information Technology, Jul. 2010.
International Search Report and Written Opinion mailed Apr. 14, 2020; International Patent Application No. PCT/US2020/013712 filed Jan. 15, 2020. ISA/US.
Buldas et al., "Server-supported RSA signatures for mobile devices", Springer International Publishing, pp. 315-333, XP047630948.
Extended European Search Report for Application 20914370.0, PCT/US2020/013712 , dated Sep. 7, 2023, 9 pgs., European Patent Office, Germany.

\* cited by examiner

DIGITAL SIGNATURE SYSTEM USING SCALABLE SERVERS

CROSS-REFERENCE TO RELATED APPLICATION

This application is a 35 U.S.C. 371 national stage filing of PCT Application No. PCT/US2020/013712 filed on Jan. 15, 2020, entitled "DIGITAL SIGNATURE SYSTEM USING SCALABLE SERVERS," which is incorporated by reference herein in its entirety.

TECHNICAL FIELD

The present disclosure generally relates to secure electronic communication and electronic commerce and, more specifically, a digital signature system using scalable servers.

BACKGROUND

Increasingly, documents are being signed digitally. Digital signatures employ systems that (a) authenticates a person signing the document is who they say they are when they sign and (b) validates that a signed document is authentic. In this manner, a person who is relying on the document can be certain that the document is authentic and the person who signed the document cannot deny that they signed it. These digital signature systems often use asymmetric cryptography which rely on a secret private key and a non-secret public key associated with an individual. To forge a signature, a malicious actor needs to obtain the secret key or spend the computational cost (if possible) of breaking the signature scheme (i.e. signing a message without having the private key). Attack tolerance to a digital signature system can be classified into mathematical tolerance (e.g., the ability to forge a digital signature by breaking the signature mathematically) or physical tolerance (e.g., tampering with a physical device to forge a signature, etc.). The growth of digital signatures is accompanied by the growth of public keys that need to be tracked and signature requests that need to be processed. As mathematical tolerance and physical tolerance increases, the need for reliable and scalable digital signature infrastructure will increase.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example embodiment for generating a digital signature includes (a) a frontend server receives a signature request from a remote application server, the signature request including a total public key with a cryptographically embedded server identifier; (b) the frontend server extracts the cryptographically embedded server identifier from the public key; (c) the frontend server selects one of a plurality of backend servers that corresponds to the server identifier; (d) the frontend server forwards the signature request to the selected backend server; (e) the selected backend server obtains a first signature and a second signature; (f) the selected backend server generates a combined signature based on the first signature and second signature; (g) the selected backend server generates a finalized signature based on the combined signature and a finalizing key; (h) the selected backend server forwards the finalized signature to the frontend server; and (i) the frontend server forwards the finalized signature to the remote application server to be appended to a digital document. The finalizing key is cryptographically generated based on the server identifier.

In some example embodiments, the backend server obtains the first signature and the second signature by identifying a first remote security device and a second remote security device that are associated in a database with the total public key, forwarding the signature request to the first remote security device and the second remote security device, and receiving the first signature from the first remote security device and the second signature from the second remote security device.

In some example embodiments, the backend server obtains the first signature and the second signature by identifying a remote security device based on the total public key, forwarding the signature request to the remote security device, receiving the first signature from the remote security device, generating the second signature using a private key associated with the total public key after authenticating an identity of a user associated with the total public key.

In some example embodiments, the backend server generates the combined signature using a composite key signature scheme. In some example embodiments, the backend server generates the combined signature using a split key signature scheme. The total public key and the finalizing key are generated using a prime number selected based on the server identifier and the combined public key.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
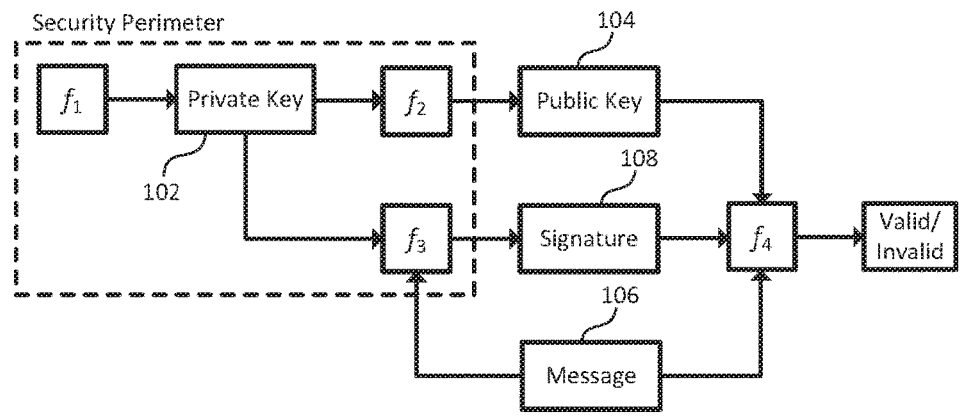
FIG. 1 illustrates a system that employs traditional asymmetric cryptography using a single private key.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

With the rise of digital signatures, computer infrastructure is needed to robustly handle the task of generating large number of signatures daily. Signatures are often requested by third party application servers. For example, a signature may be required to acknowledge that a customer has read a website's privacy and personal data policy, or a signature may be required when a customer signs government documents, such as tax documents, or commercial contracts (e.g., mortgage applications, etc.). However, the third party application servers are independent from the digital signature scheme and are not equipped to handle the actual signature process. The Signature generation process becomes more complicated when one or more physical security devices are used in the signature generating process. It is not practical for third party application servers to know how to contact the physical security devices. Additionally, as the role of digital signatures become ubiquitous, an infrastructure scheme is needed to add security devices and handle signature generation in a reliable manner.

As described below, a Signature Authority (SA) includes backend servers and frontend servers. The backend servers perform signature functions and communicate with specific security devices and/or security tokens. Each backend server has a unique identifier (a "BESID"). The frontend servers communicate with third party application servers to handle signature requests. A customer registers with the Signature Authority. During the registry process, a customer associates themselves with one or more physical security devices and/or physical security tokens. The security device(s) and/or security token(s) are assigned to a particular backend server so that it is that particular backend server that has the information necessary to communicate with the particular security device and/or security token.

When a composite key scheme is used, (a) the security devices generate a private key and a public key and provides the public key to the designated backend server and/or, (b) when a security token is used, the assigned backend server generates a private key and a public key associated with the customer. Using the two or more independent public keys, the backend server creates a composite public key. The backend server then creates a total public key based on the composite public key and the BESID. This total public key is transmitted to a public key repository (such as a Certificate Authority (CA)) along with data to identify the customer. The backend server also generates a finalizing key based on the BESID to be used during signature generation.

When a split key scheme is used, the backend server generates two or more key shares and a public key. The backend server shares one of the key shares with the security device and keeps one of the key shares. The backend server then creates a total public key based on the public key and the BESID. This total public key is transmitted to a public key repository (such as a Certificate Authority (CA)) along with data to identify the customer. The backend server also generates a finalizing key based on the BESID to be used during signature generation.

The security devices may be any portable electronic device that is capable of (a) securely storing the independently generated private key, (b) receiving an input from a signer, (c) reliably authenticating the identity of the signer based on that input, (d) receiving a message to generate a signature, (e) generating the signature with the independently generated private key and the message, and (f) transmitting the signature to a computing device (e.g., a server, etc.) requesting the signature. In some examples, the security devices may be smartphones, smart watches, tablet computers, jewelry with embedded electronics (e.g., bracelets, rings, broaches, etc.), smart cards (e.g., a credit card, an identification card, etc.), and/or an electronic hanko, etc. In some examples, each security device is configured to physically receive an input (e.g., a biometric identifier such as a fingerprint, a password, etc.) from the signer independently from any other security device. In some examples, each security device communicates with computing device (e.g., via a wireless connection to the Internet, etc.). Alternatively, in some examples, one of the security devices acts as a primary device that communicates with the computing device (e.g., via a wireless connection to the Internet, etc.) while other security devices communicate with the primary device via a local area network (e.g., a wireless local area network, a Bluetooth® Low Energy connection, etc.) to communicate with the computing device.

The security token communicates directly or indirectly (e.g., via a mobile device) with the backend server to authenticate an identity of the customer when the backend server is generating a digital signature. The security token may be any mobile device that can communicate with the backend server and securely provide user credentials when the user provides authentication to the device. For example, the device may have biometric sensors and/or biometric input (e.g., a iris scanner, a finger printer scanner, etc.). As another example, the device may have a GPS and may rely on geofencing or its proximity to another device (e.g., a security device) in order to authenticate the user. In some examples, the security token may be another security device that is not involved in the current signature generation. In some examples, the security token is jewelry with embedded electronics (e.g., bracelets, rings, broaches, etc.) or a smart card (e.g., a credit card, an identification card, etc.).

When a digital signature is to be created, the customer provides credentials to an application server (e.g., credential controlled by the application server to identify the customer). The application server uses the identity of the customer to retrieve a total public key from a public key repository (such as the Certificate Authority). The application server has an established relationship with a frontend server of the Signature Authority (e.g., established when the application server enrolls with the Signature Authority, etc.). The application server sends a signature request to the frontend server that includes the total public key retrieved from the public key repository and a message. The message may be an original message (e.g., the digital document to be signed) or a message digest computed from the original message by applying a cryptographic hash function (e.g., SHA-256, etc.) to the original message. The frontend server extracts the BESID from the total public key and forwards the signature request to the backend server associated with the BESID. The backend server, in conjunction with security devices and/or security tokens generates a signature with the message. The backend sever then uses the finalizing key to generate a finalized signature. The backend server sends the finalized signature to the frontend server that sent the signature request. The frontend server then forwards the finalized signature to the application server that requested the signature. The application then appends the finalized signature to a digital document. Later, when required, the digital signature can be verified using the total public signature in the public key repository.

FIG. 1 illustrates a system that employs traditional asymmetric cryptography using a single private key, and generally, the system to verify a signature. A common asymmetric cryptography system (sometimes referred to as a "public key cryptosystem") used for digital signatures is Rivest-Shamir-Adleman (RSA). As illustrated in FIG. 1, the RSA cryptosystem uses four functions. The first function is a Private Key Generation function ($f_1$), which generates a private key 102 based on two distinct prime numbers p and q. The integers p and q are randomly chosen and are kept secret. The second function is a Public Key Generation function ($f_2$) which generates a public key 104 based on the two prime numbers p and q. The public key 104 consists of a public modulus (n) and a public exponent (e). The public modulus (n) is calculated in accordance with Equation 1 below. The public exponent (e) is selected such that Equation 2 below is true.

$$n=pq \qquad \text{Equation 1}$$

$$gcd(p-1,e)=gcd(q-1,e)=1 \qquad \text{Equation 2}$$

In equation 2 above, gcd is the greatest common divisor function that returns the largest positive integer that divides each of the inputs. The RSA cryptosystem uses a signing function ($f_3$) to sign a message (m) 106 with the private key 102, where $m \in \mathbb{Z}_n = \{0, \ldots, n-1\}$. The RSA cryptosystem uses a private exponent (d) to calculate the signature 108 of the message (m) 106. The private exponent (d) is calculated in accordance with Equation 3 below.

$$d = \frac{1}{e} \mod(p-1)(q-1) \qquad \text{Equation 3}$$

The signature 108 of the message (m) 106 is σ(m), which is calculated in accordance with Equation 4 below.

$$\sigma(m)=m^d \mod n \qquad \text{Equation 4}$$

To verified a received signature (G) 108 and an accompanying message (m) 106, the RSA cryptosystem uses a fourth function ($f_4$) based on the public modulus (n) and the public exponent (e). The signature (G) 108 is verified when Equation 5 below is true.

$$\sigma^e \mod n = m \qquad \text{Equation 5}$$

Secure implementation of a signature scheme based on RSA requires that a signer (e.g., a person or group of persons) has sole control of the functions: the Private Key Generation function ($f_1$), the Public Key Generation function ($f_2$), and the signing function ($f_3$) within a security perimeter. Typically, a device implementing the RSA signature scheme: (a) executes the Private Key Generation function ($f_1$) and the Public Key Generation function ($f_2$) only once in a lifetime of the device; and (b) assures that only the authorized signer can execute the signing function ($f_3$). The private key (e.g., the private key 102) must never leave the device. The device must always be capable of reliably authenticating the signer before executing signing function ($f_3$). Thus, the security device requires, within the security perimeter, (a) computational power to computer the functions, (b) memory to store the keys, (c) input/output (I/O) devices, and (d) an authentication solution. The security perimeter may consist of separate electronics that each implement a partial functionality. For example, the key generating functions, the Private Key Generation function ($f_1$) and the Public Key Generation function ($f_2$), may be implemented by one set of electronics, and the signing function ($f_3$) may be implemented as a separate set of electronics.

The cryptographic attack tolerance of a signature scheme (such as the RSA cryptosystem described above) is defined in terms of computational complexity theory and has mathematical and physical components. The measure of mathematical attack tolerance takes into account the computational resources (number of steps, memory in bits, program size, etc.) that is necessary to break the scheme (i.e., sign a message without having access to the private key). The computational cost of breaking the scheme is expressed as a security level. The security level is usually expressed in "bits." "N-bit security" means that the malicious actor would have to perform $2^N$ operations to break the scheme. For example, a signing scheme may have 128-bit or 256-bit security. The monetary cost of breaking the scheme is considered proportional with the computational cost. Physical attack tolerance of a security device refers to the cost of forging a signature without breaking the signature scheme mathematically (e.g., tampering with the security device).

The mathematical and physical attack tolerance required for a signing scheme are derived from risk analysis and takes into account the application in which the signature solution is being used. Often, the physical design of security devices are a weakness in an RSA-based signing scheme. One approach to increasing physical attack tolerance is to require cooperation between multiple devices. In such an approach, a signature key (e.g., a master private key) is shared between several security devices. As such, a signature can only be created when the security devices cooperate. Attacking one device (e.g., physically tampering with one device, uncovering the portion of the master private key on one device, etc.) is insufficient to forge signatures. Cryptography schemes in to address these issues are discussed in connection with FIGS. 2 and 3 below.

Figure 2:
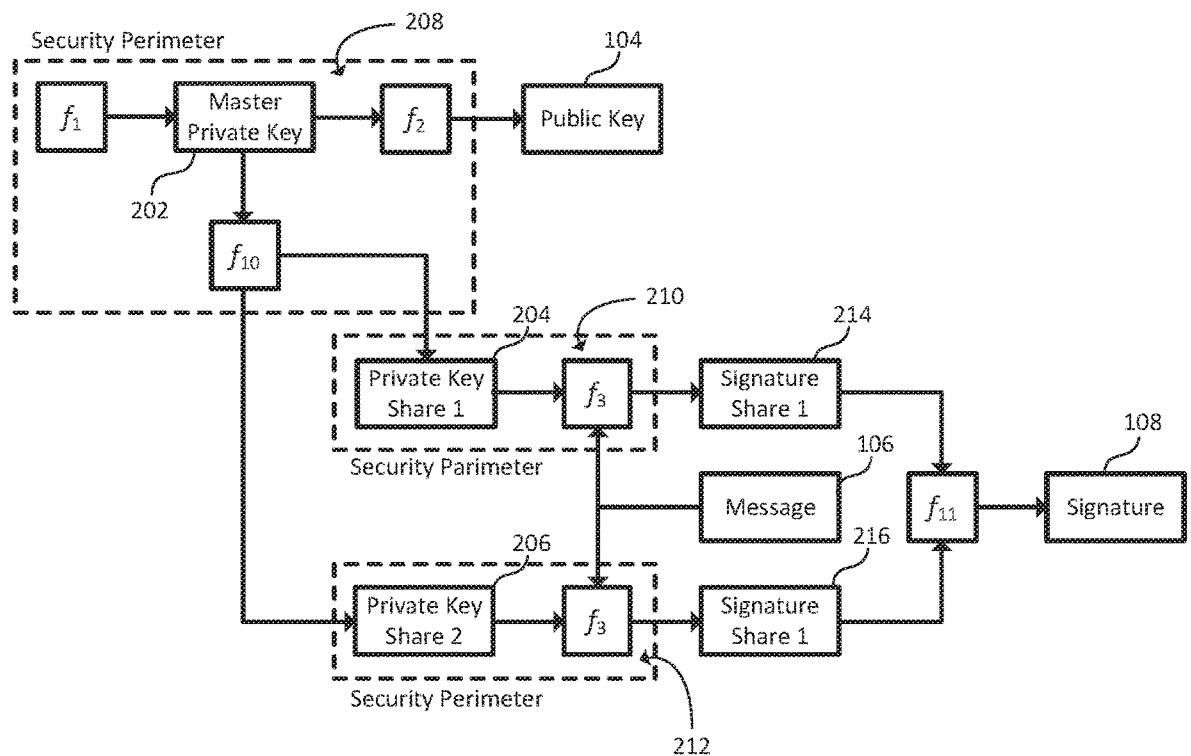
FIG. 2 illustrates a system that employs split-key asymmetric cryptography that uses multiple private key shares that are dependent on a single private key.

In FIG. 2, a master private key 202 is split into two private key shares 204 and 206 (sometimes referred to as a Split-Key signing scheme). The master private key 202 is generated by a trusted dealer 208 who splits the master private key 202 with a key split function ($f_{10}$) to create a first private key share (d') 204 and a second private key share (d") 206. The trusted dealer 208 may split the master private key 202 for additive sharing or for multiplicative sharing. FIG. 2 illustrates the trusted dealer 208 splitting the master private key 202 for additive sharing. When splitting for additive sharing, the trusted dealer 208 uses the key split function ($f_{10}$) to derive the first private key share (d') 204 and the second private key share (d") 206 based on the private exponent (d) of the master private key 202 in accordance to Equation 6 below.

$$d=d'+d'' (\mod \varphi(n)) \qquad \text{Equation 6}$$

When splitting for multiplicative sharing, the trusted dealer 208 uses the key split function ($f_{10}$) to derive the first private key share (d') 204 and the second private key share (d") 206 in accordance to Equation 7 below.

$$d=d'd'' (\mod \varphi(n)) \qquad \text{Equation 7}$$

The trusted dealer 208 transmits the first private key share (d') 204 to a first security device 210 and the second private key share (d") to a second security device 212. When generating a signature, the security devices 210 and 212 perform the signing function ($f_3$) with their respective private key shares to generate a first signature share ($\sigma'$) 214 and a second signature share ($\sigma''$) 216. The signature ($\sigma$) 108 is generated with the first signature share ($\sigma'$) 214 and the second signature share ($\sigma''$) 216 with a splitkey combiner function ($f_{11}$). For additive sharing, the splitkey combiner function ($f_{11}$) is calculated in accordance with Equation 8 below.

$$\sigma = \sigma' \cdot \sigma'' \bmod n = m^{d'+d''} \bmod n \qquad \text{Equation 8}$$

For multiplicative sharing, the splitkey combiner function ($f_{11}$) is calculated in accordance with Equation 9 below.

$$\sigma = \sigma''(\sigma'(m)) = m^{d'd''} \bmod n \qquad \text{Equation 9}$$

The generated signature 108 is used as described above with the traditional RSA signing scheme.

In some examples, one of the private key shares is held by security device and the other private key share is held by a backend server (e.g., the backend server 512 of FIGS. 5, 6, and 7 below) The Split-Key signing scheme often requires the trusted dealer 208 to split a master private key 202 into the signature shares 204 and 206 and then securely transmitting the signature shares 214 and 216 to the security devices. In some examples, the trusted dealer 208 uses a distributed generation of shares is used, where the first signature share ($\sigma'$) 214 and the second signature share ($\sigma''$) 216 and the common public key 104 are generated as the outcome of a multi-party cryptographic protocol (e.g., the multi-party cryptographic protocol II) in which the master private key 202 never exists as a whole.

Figure 3:
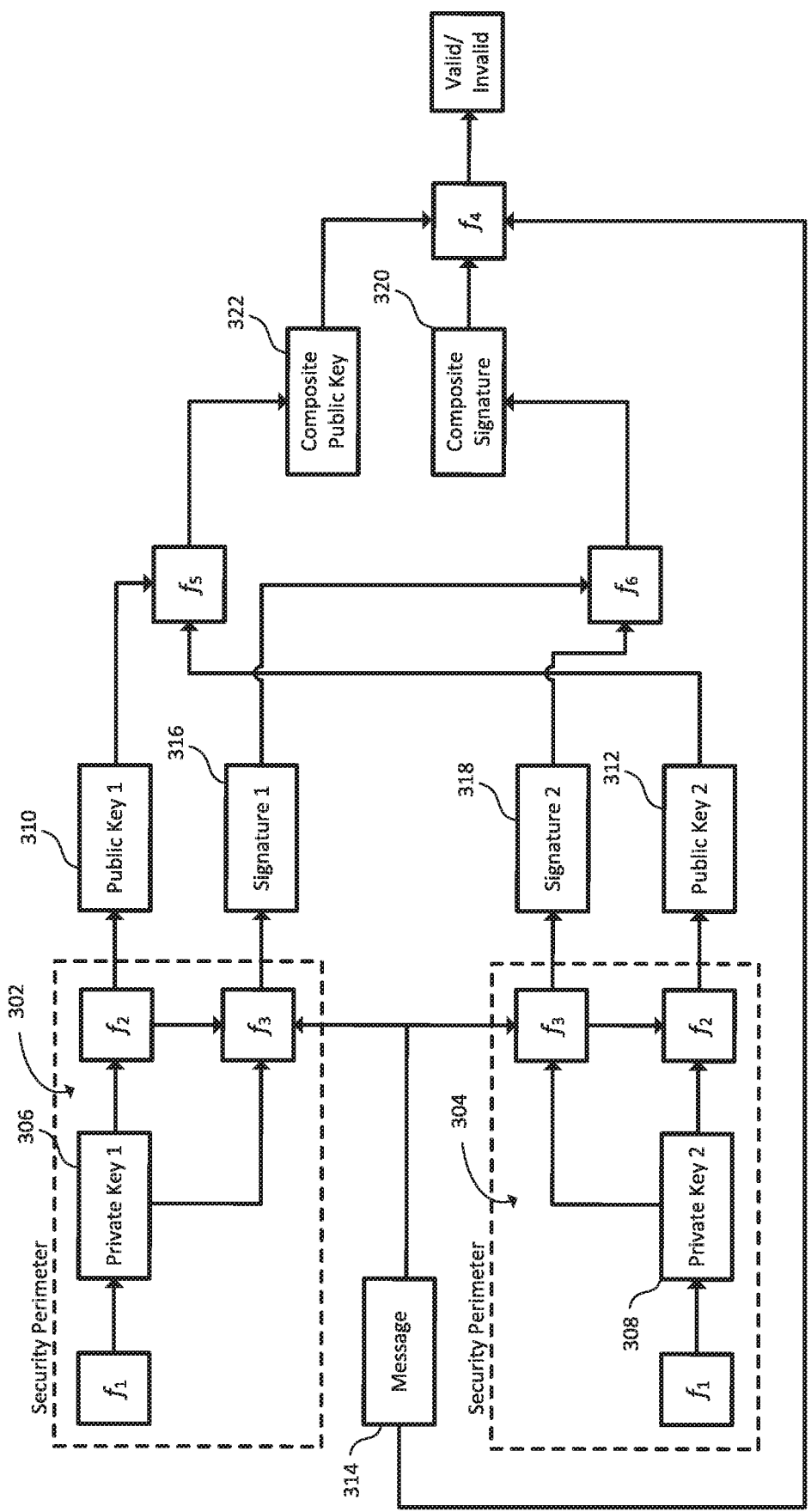
FIG. 3 illustrates a system that employs composite-key asymmetric cryptography that uses multiple private keys that are independent of each other.

FIG. 3 illustrates a cryptographic scheme using signature generation using cooperation between multiple devices. Instead of generating a set of signature shares dependent on either a master private key or a multi-party cryptographic protocol, a composite signature can be composed from individually generated signatures that are based on independently generated private keys. This is sometimes referred to as a Composite (Comp) Key scheme. As used herein, an independently generated private key is a private key that was not generated using any master private key or multi-party cryptographic protocol (e.g., as opposed to the private key shares of the Split Key signing scheme). The system includes two or more devices each storing an independently generated private key that is associated with its own public key. In some examples, the system includes two or more security devices. In some examples, the system includes one or more security devices and a backend server (e.g., authenticated by a security token).

FIG. 3 illustrates a system that employs composite-key key asymmetric cryptography that uses multiple private keys that are independent of each other. FIG. 3 illustrates a Comp Key signing scheme using a first security device 302 and a second security device 304. In some examples, one of the first or second security devices 302 and 304 is a backend server (e.g., the backend server 512 of FIGS. 5, 6, and 7 below). The security devices 302 and 304 each independently generate a private key 306 and 308 using the Private Key Generation function ($f_1$) (as described above). Additionally, the security devices 302 and 304 each generate a public key 310 and 312 with a public modulus (n) (e.g., calculated in accordance with Equation 1 above) and a public exponent (e) (e.g., determined in accordance with Equation 2 above). The public keys 310 and 312 are transmitted to the backend server. When the security devices 302 and 304 receive a message 314 to use to generate a signature, after the security devices each independently authenticate the signer, the security devices 302 and 304 use the signing function ($f_3$) (as described above) to each independently generate a signature 316 and 318.

To sign a digital document, a composite signature 320 is generated from the first signature ($\sigma_1$) 316 and the second signature ($\sigma_2$) 318. In the illustrated example, the composite signature ($\sigma_C$) 320 is generated with a composite signature function ($f_6$) in accordance with Equation 10 below.

$$\sigma_C = (bn_1\sigma_1 + an_2\sigma_2) \bmod (n_1 n_2) \qquad \text{Equation 10}$$

In Equation 10 above, $n_1$ is the public modulus of the first public key 310 and $n_2$ is the public modulus of the second public key 312. Additionally, the coefficients a and b satisfy $an_1 + bn_2 = 1$. The composite signature ($\sigma_C$) 320 is further modified by the backend server and then used to append a digital document.

To verify a signed document, the composite public modulus ($n_C$) of the composite public key 322 is calculated using a composite public key function ($f_5$) in accordance with Equation 11 below. The composite public modulus ($n_C$) of the composite public key 322 is based on the public modulus ($n_1$) of the first public key 310 and the second public modulus ($n_2$) of the second public key 312.

$$n_c = n_1 n_2 \qquad \text{Equation 11}$$

Using the composite public key 322 ($<n_C, e>$) and the message 314, the signature ($\sigma_S$) associated with the signed digital document is verified with function $f_4$ (as described above).

Figure 4:
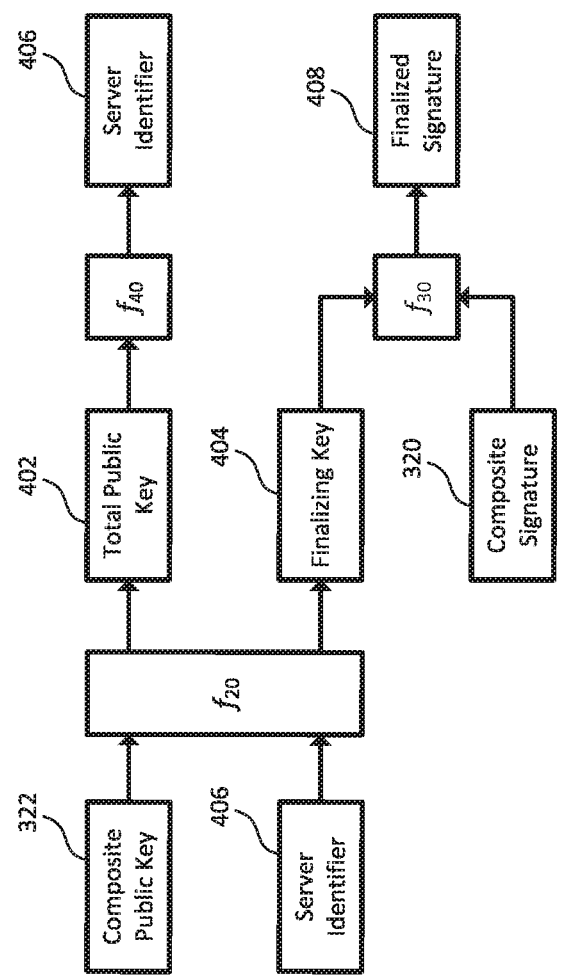
FIG. 4 illustrates a system that generates a total public key and a finalized signature using specific server information.

FIG. 4 illustrates a system that generates a total public key 402 and a finalizing key 404 using a unique backend server identifier (BESID) 406. The system embeds the BESID 406 into the total public key 402 and the finalizing key 404. The description below uses the Comp Key scheme, but the Split Key scheme may also be used.

The system generates the total public key 402 and a finalizing signature 408 using an identity embedding function ($f_{20}$). The identity embedding function ($f_{20}$) uses the composite public key 322 (or any other applicable public key) and the BESID 406 to generate the total public key 402 and the finalizing signature 408. In the illustrated example, the identity embedding function ($f_{20}$) is calculated in accordance with Equations 12 through 17 below. First, the system computes an L bound according with Equation 12 below.

$$L = \left\lceil \frac{c \cdot 2^{k+l'}}{n'} \right\rceil \qquad \text{Equation 12}$$

The system computes an R bound in accordance with Equation 13 below.

$$R = \left\lfloor \frac{(c+1) \cdot 2^{k+l'}}{n'} \right\rfloor \qquad \text{Equation 13}$$

In Equations 12 and 13 above, c is the m-bit length BESID, k is a reliability parameter, and n' is an RSA modulus (with $2^{l'-1} \leq n' < 2^{l'}$ and $2^{m-1} \leq n' < 2^m$) (such as, the modulus ($n_C$) of the composite public key 322, etc.). The system then finds prime number (p) where Equation 14 below is true.

$$L \leq p \leq R \text{ and } \gcd(p-1, e) = 1 \qquad \text{Equation 14}$$

In Equation 14 above, e is the public exponent and gcd is the greatest common divisor function that returns the largest positive integer that divides each of the inputs.

The system computes a modulus ($n_{TP}$) of the total public key 402 in accordance with Equation 15 below.

$$n_{TP} = n' \cdot p \qquad \text{Equation 15}$$

As a result, the identity embedding function ($f_{20}$) outputs the total public key 402 as $\langle n_{TP}, e \rangle$.

The system computes a finalizing exponent ($d_f$) in accordance with Equation 16 below.

$$d_f = \frac{1}{e} \bmod(p-1) \qquad \text{Equation 16}$$

The system then finds the Bezout coefficients a' and b' such that Equation 17 below is satisfied.

$$a' \cdot p + b' \cdot n' = 1 \qquad \text{Equation 17}$$

As a result, the identity embedding function ($f_{20}$) outputs the finalizing key 404 as (n, a', b', p, $d_f$).

After the backend server generates the composite signature 320, the system generates a finalized signature ($\sigma_F$) 408 to send to the frontend server to be forwarded to the requesting application server. The finalized signature ($\sigma_F$) 408 has the BESID 406 of the backend server embedded in it using a finalizing function ($f_{30}$). The finalizing function ($f_{30}$) uses an RSA signature ($\sigma'$) (such as, the composite signature ($\sigma_C$) 320, etc.), a padded message P, and the finalizing key 404 (e.g., (n, a', b', p, $d_f$), etc.) to generate the finalized signature ($\sigma_F$). In the illustrated example, the finalizing function ($f_{30}$) is calculated in accordance with Equations 18 through 20 below. Initially, the system reduces the padded message P in accordance with Equation 18 below.

$$P_f = P \bmod p \qquad \text{Equation 18}$$

In Equation 18 above, $P_f$ is the reduced message. The system then computes a partial final signature ($\sigma_f$) in accordance with Equation 19 below.

$$\sigma_f = P_f^{d_f} \bmod p \qquad \text{Equation 19}$$

The system them computes the finalized signature ($\sigma_F$) 408 in accordance with Equation 20 below.

$$\sigma_F = \left(\frac{n_{TP} \cdot b' \cdot \sigma_f}{p} + p \cdot a' \cdot \sigma'\right) \bmod n_{TP} \qquad \text{Equation 20}$$

The system then forwards the finalized signature ($\sigma_F$) to the frontend server.

When the frontend server receives a signature request from the application server, the signature request includes the total public key 402 $\langle n_{TP}, e \rangle$. The frontend server extracts the BESID 406 from the total public key 402 using an identity extraction function ($f_{40}$) The BESID 406 has an m-bit length. In the illustrated example, the identity extraction function ($f_{40}$) extracts the BESID by extracting the m most significant bits of the modulus ($n_{TP}$) of the total public key 402. The m most significant bits of the modulus ($n_{TP}$) is the BESID 406.

Figure 5:
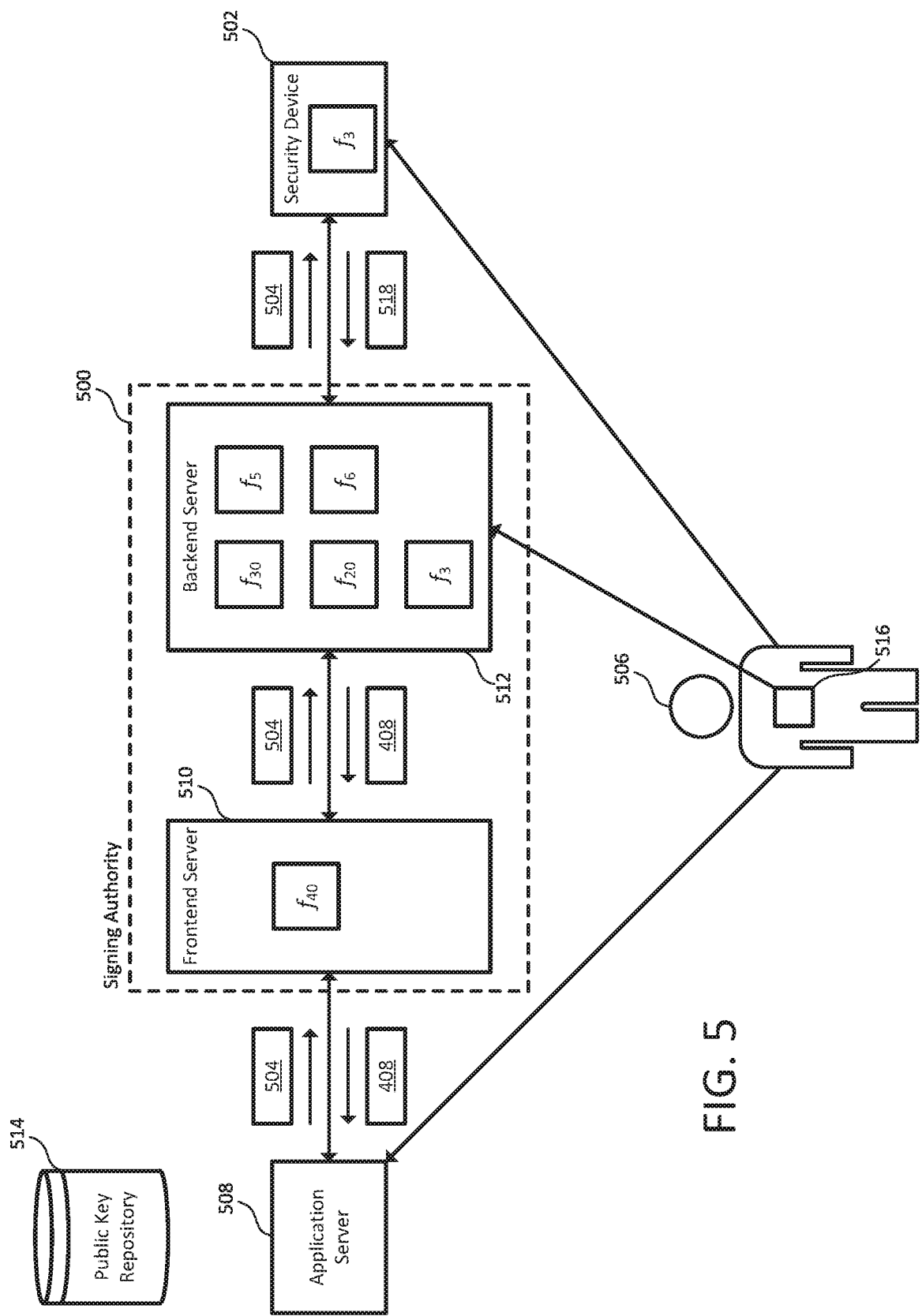
FIGS. 5 and 6 are block diagrams of a signing authority that facilitates generating a signature in cooperation with one or more remote security devices in response to a signature request.
Figure 6:
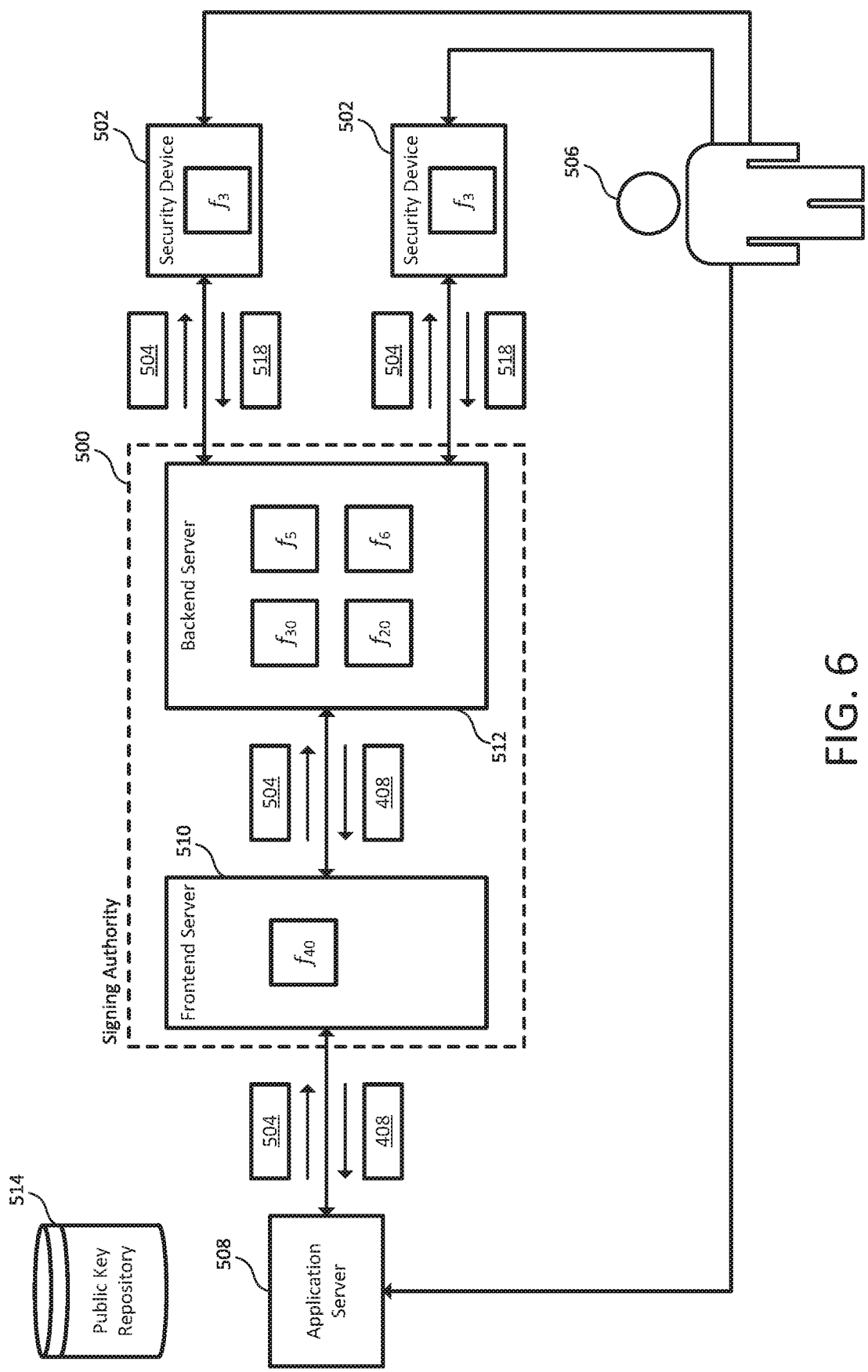

FIGS. 5 and 6 are block diagrams of a signing authority 500 that facilitates generating a signature in cooperation with one or more remote security devices 502 in response to a signature request 504. A customer 506 interacts with an application server 508 in a manner such that the application server 508 generates a signature request 504. For example, the customer 506 may be signing a document or accepting a privacy and data use policy on a website. The signing authority 500 manages the signature process and communicates with the required security devices 502.

The signing authority 500 includes one or more frontend servers 510 and one or more backend servers 512. Each of the frontend servers 510 is communicatively coupled to each of the backend servers 512. As more application servers 508 use the signing authority 500, the signing authority may add more frontend servers 510. A particular application server 508 may be associated with a particular frontend server 510 or a list of frontend servers 510. When the application server 508 sends the signature request 504, it sends it to an associated frontend server 510. In some examples, the application server 508 communicate with the frontend servers 510 using an Application Programming Interface (API).

As more security devices 502 are deployed, the signing authority 500 adds more backend servers 512. The backend servers 512 communicate with particular ones of the security devices 502. The backend servers 512 include a database of security devices 502 with information necessary to communicate with the assigned security devices 502.

The frontend servers 510 and the backend servers 512 may operate on the same physical machine or set of physical machines using virtual computing resources, such as virtual machines or containers, etc. In some examples, the frontend servers 510 and the backend servers 512 are isolated from each other so that if one is breached, none of the others are affected. For example, if one frontend server 510 is breached, the other frontend servers 510 and the backend servers 512 are not affected.

The customer 506 interacts with the application server 508. In a manner established by the application server 508, the application server 508 authenticates and identifies the customer 506. For example, the application server 508 may require the customer 506 create an account with login credentials and enough personal information in order to be able to retrieve a public key associated with the customer 506 from a public key repository 514 (such as a Certificate Authority). Based on an interaction with the customer 506 that requires a digital signature, the application server 508 generates the signature request 504. To generate the signature request 504, the application server 508 (a) retrieves a total public key (e.g., the total public key 402 of FIG. 4 above) from the public key repository 514 and (b) generates a message. The message may be an original message (e.g., the digital document to be signed) or a message digest computed from the original message by applying a cryptographic hash function (e.g., SHA-256, etc.) to the original message. The application server 508 send the signature request 504 to the signing authority 500. The application server 508 sends the signature request 504 to the associated backend server 510.

The frontend server 510 receives the signature request 504 from the application server 508. Using the identity extraction function ($f_{40}$), the frontend server 510 extracts the BESID 406 of the backend server 512 from the total public key 402. The BESID 406 corresponds to the backend server 512 that has a relationship with the security device(s) 502 of the customer 506. The frontend server 510 forwards the signature request to the backend server 512 associated with the BESID 406.

The backend server 512 identifies the customer 506 using the total public key 402.

FIG. 5 illustrates an example embodiment where the backend server 512 includes a private key associated with the customer 506 (e.g., an independent private key for the Comp Key scheme or a key share for the Split Key scheme, etc.). In FIG. 5, the backend server 512 attempts to authenticate the identity of the customer 506 (e.g., via a security token 516). When the backend server 512 successfully authenticates the identity of the customer 506, it uses the signing function ($f_3$) to generate a first signature (or first signature share) using the message and the private key associated with the customer 506. The backend server 506 also sends the signature request (or a part thereof) to the security device 502 associated with the customer 506. After the security device 502 authenticates the identity of the customer 506, the security device 502 generates a second signature (or a second signature share) 518 and sends it the backend server 512. In Comp Key embodiments, the backend server 512 generates a composite signature 320 using the composite signature function ($f_6$). In Split Key embodiments, the backend server 512 generates signature using the splitkey combiner function ($f_{11}$). Using the finalizing key 404, the backend server 512 generates the finalized signature 408 using the finalizing function ($f_{30}$).

FIG. 6 illustrates an example embodiment where the backend server 512 communicates with two or more security devices 502. The backend server 506 sends the signature request (or a part thereof) to each of the security devices 502 associated with the customer 506. Each of the security devices 502 then independently authenticates the customer 506, generates a signature (or a signature share) 518 and sends it the backend server 512. In such an embodiment, the backend server 512 does not store a private key associated with the customer 512. In Comp Key embodiments, the backend server 512 generates a composite signature 320 using the composite signature function ($f_6$). In Split Key embodiments, the backend server 512 generates signature using the splitkey combiner function ($f_{11}$). Using the finalizing key 404, the backend server 512 generates the finalized signature 408 using the finalizing function ($f_{30}$).

The backend server 512 sends the finalized signature 408 to the frontend server 510 that sent the signature request 504. The frontend server 408 sends the finalized signature 408 to the application server 508 that sent the signature request 504. The application server 508 appends the finalized signature 408 to the digital document to be signed.

When a customer 506 registers with the signing authority 500 and/or adds a security device 502 to be associated with them, the backend server 512 creates a total public key 402 and a finalizing key 404 and associates both of these keys with the customer 506 (e.g., using a customer unique identifier and a security device unique identifier, etc.). Using a public key (e.g., the composite public key 322 created using the composite public key function ($f_5$), or the common public key 104, etc.) and the BESID 406 of the backend server 512, the backend server 512 creates the total public key 402 and the finalizing key 404 with the identity embedding function ($f_{20}$). The total public key 402 is transmitted to the public key repository 514 to be associated with the customer 506.

Figure 7:
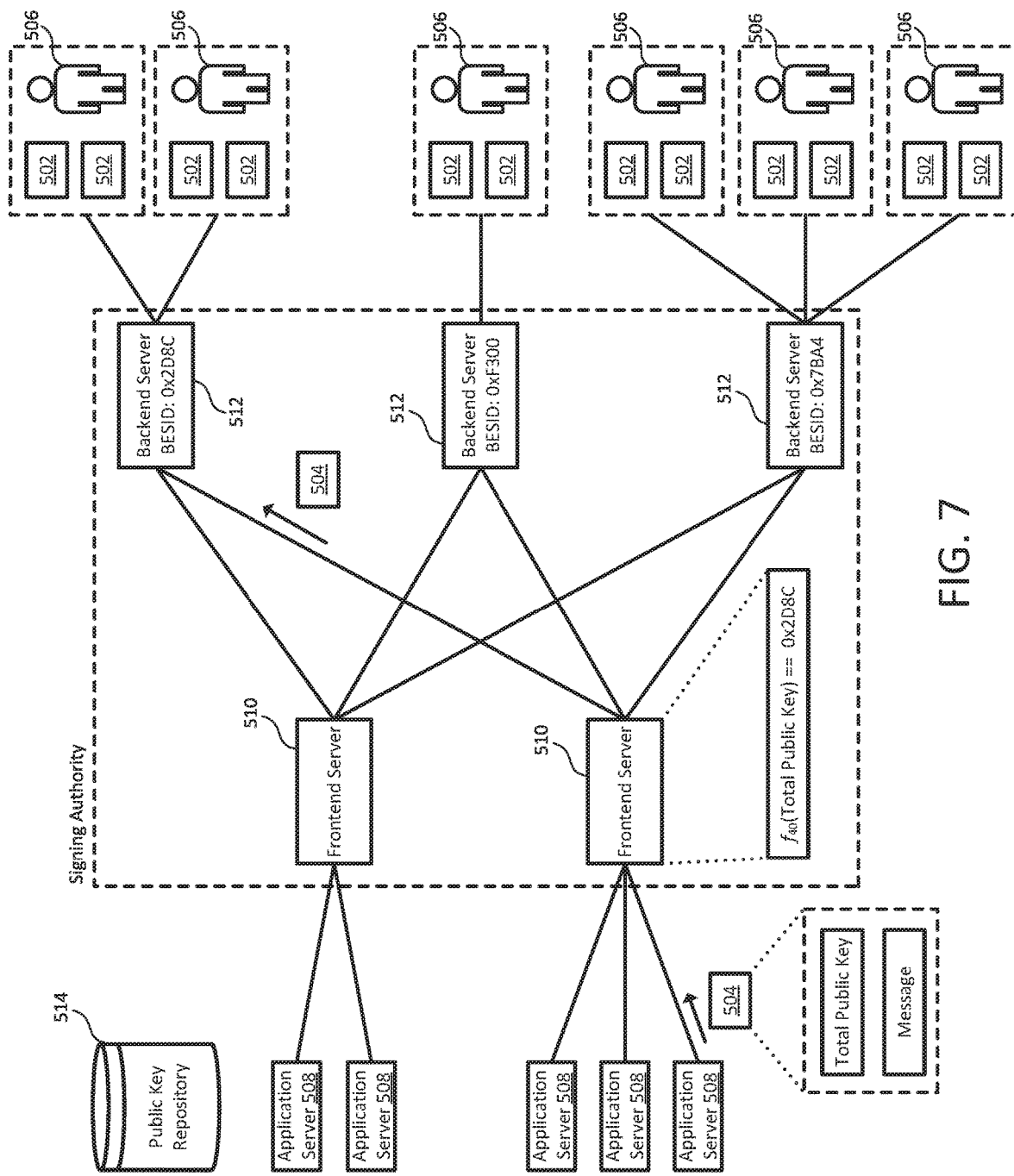
FIG. 7 illustrates an example system including the signing authority of FIGS. 5 and 6.

FIG. 7 illustrates an example system including the signing authority 500 of FIGS. 5 and 6. In the illustrated example in FIG. 7, the signing authority 500 includes instances of multiple frontend servers 510 connected to multiple applications servers 508. FIG. 7 also illustrates multiple instances of the backend servers 512 each connected to multiple security devices 502 associated with multiple customers 506. In the illustrated example, one of the application servers 504 sends a signature request 504 to one of the frontend servers 510. The frontend server 510 determines the BESID 406 that is cryptographically embedded in the total public key 402 included with the signature request 504 using the identity extraction function ($f_{40}$). Based on the extracted BESID 406, the frontend server 510 forwards the signature request 504 to the corresponding backend server 512.

Figure 8:
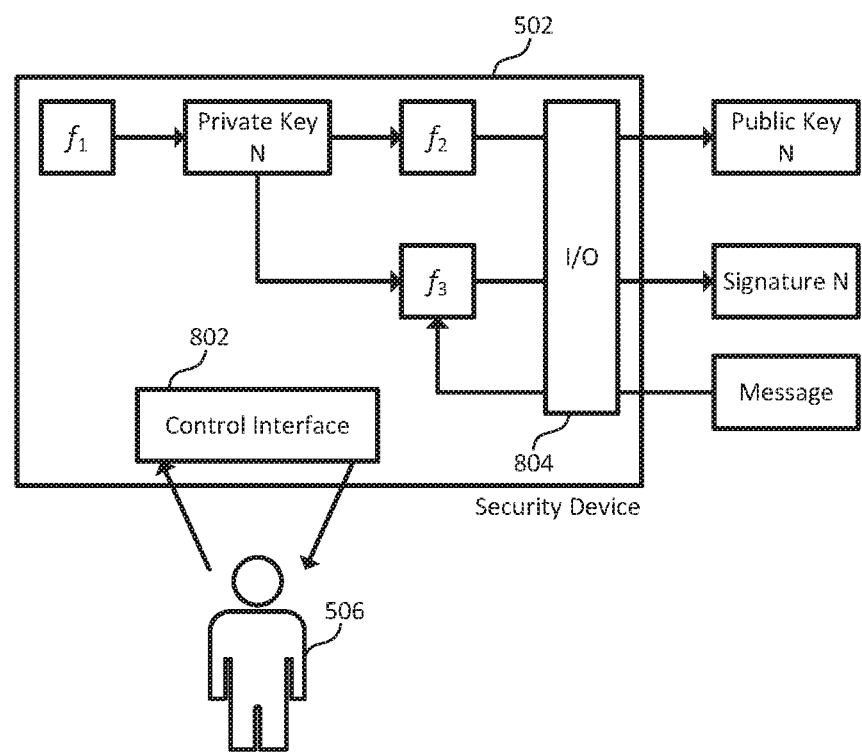
FIG. 8 illustrates a secure device implementing a device-side portion of the asymmetric cryptography of FIGS. 5, 6, and 7.

FIG. 8 illustrates a secure device 502 implementing a device-side portion of the signing scheme of FIGS. 1, 2, 3, 5, 6, and 7. The security device 502 implements the functions: the Private Key Generation function ($f_1$), the Public Key Generation function ($f_2$), and signing function ($f_3$). The security device 502 includes a control interface 802 and a input/output (I/O) interface 804. The control interface 802 receives input from a signer (e.g., the customer 506, etc.) to authenticate the identity of the signer before the security device 502 generates a signature (e.g., the signatures 316 and 318). The I/O interface 804 communicates directly or indirectly with a signing authority (e.g., the signing authority 500 of FIGS. 5, 6, and 7 above) to transmit the signature and the public key, and receive the message used to generate the signature.

Figure 9:
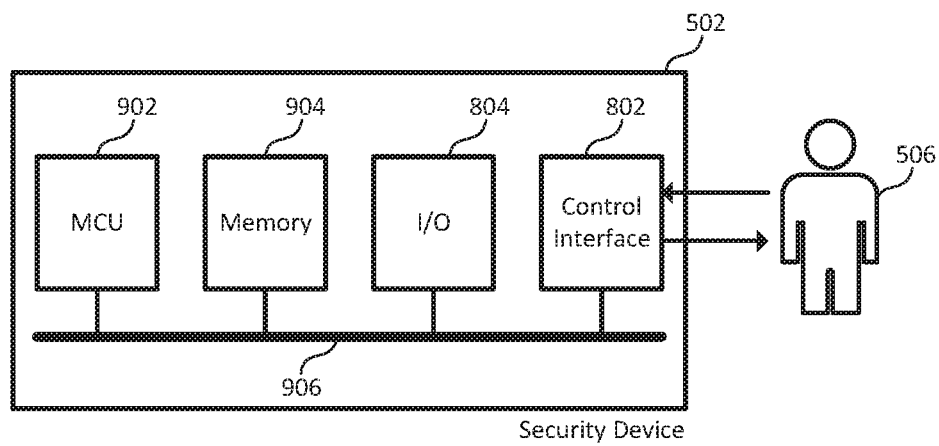
FIG. 9 is a block diagram of electronic components of the secure device of FIG. 8.

FIG. 9 is a block diagram of electronic components 900 of the security device 502 of FIG. 8. In the illustrated example, the electronic components 900 include the control interface 802, the I/O interface 804, a processor or controller 902, and memory 904, and a data bus 906 that connects the other electronic components.

The control interface 802 provides a physical interface between the security device 502 and the signer. The control interface 802 may include a digital camera (e.g., for image capture, visual command recognition, facial recognition, iris recognition, etc.), a touch screen and/or keyboard (e.g., for input of credentials), an audio input device (e.g., a microphone for voice recognition, etc.), a biometric input device (e.g., a fingerprint scanner, etc.) and/or a biometric sensor (e.g., a pulse oximeter, a pulse sensor, etc.). For example, the control interface 802 may include the touch screen and fingerprint identity sensor of a smart phone. The input from the signer to the control interface 802 is used to authenticate the identity of the signer. In some examples, more than one method of identifying and authenticating the signer is included. For example, the signer may need to provide both a fingerprint and a password. In some examples, the control interface 802 may be different between two cooperating security devices 502. For example, one security device 502 may have a camera to perform facial recognition and the other security device 502 may have a fingerprint scanner.

The I/O interface 804 provides an interface to communicate with other devices to transmit the public key and the signature and receive the message. The I/O interface 804 includes communication controllers and antenna for one or more for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), Bluetooth® and Bluetooth® Low Energy, and Wireless Gigabit (IEEE 802.11ad), etc.). The I/O interface 804 directly or indirectly (e.g., via anther security device 502) communicates with an external network. The external network may be a public network, such as the Internet; a private network, such as an intranet; or combinations thereof, and may utilize a variety of networking protocols now available or later developed including, but not limited to, TCP/IP-based networking protocols.

The processor or controller 902 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 904 may be volatile memory, non-volatile memory, unalterable memory, read-only memory, and/or high-capacity storage devices (e.g., hard drives, solid state drives, etc). In some examples, the memory 904 includes multiple kinds of memory, particularly volatile memory and non-volatile memory. Additionally, the memory 904 may include secure memory (sometimes referred to as "cryptomemory") which includes an embedded hardware encryption engine with its own authentication keys to securely store information.

Figure 10:
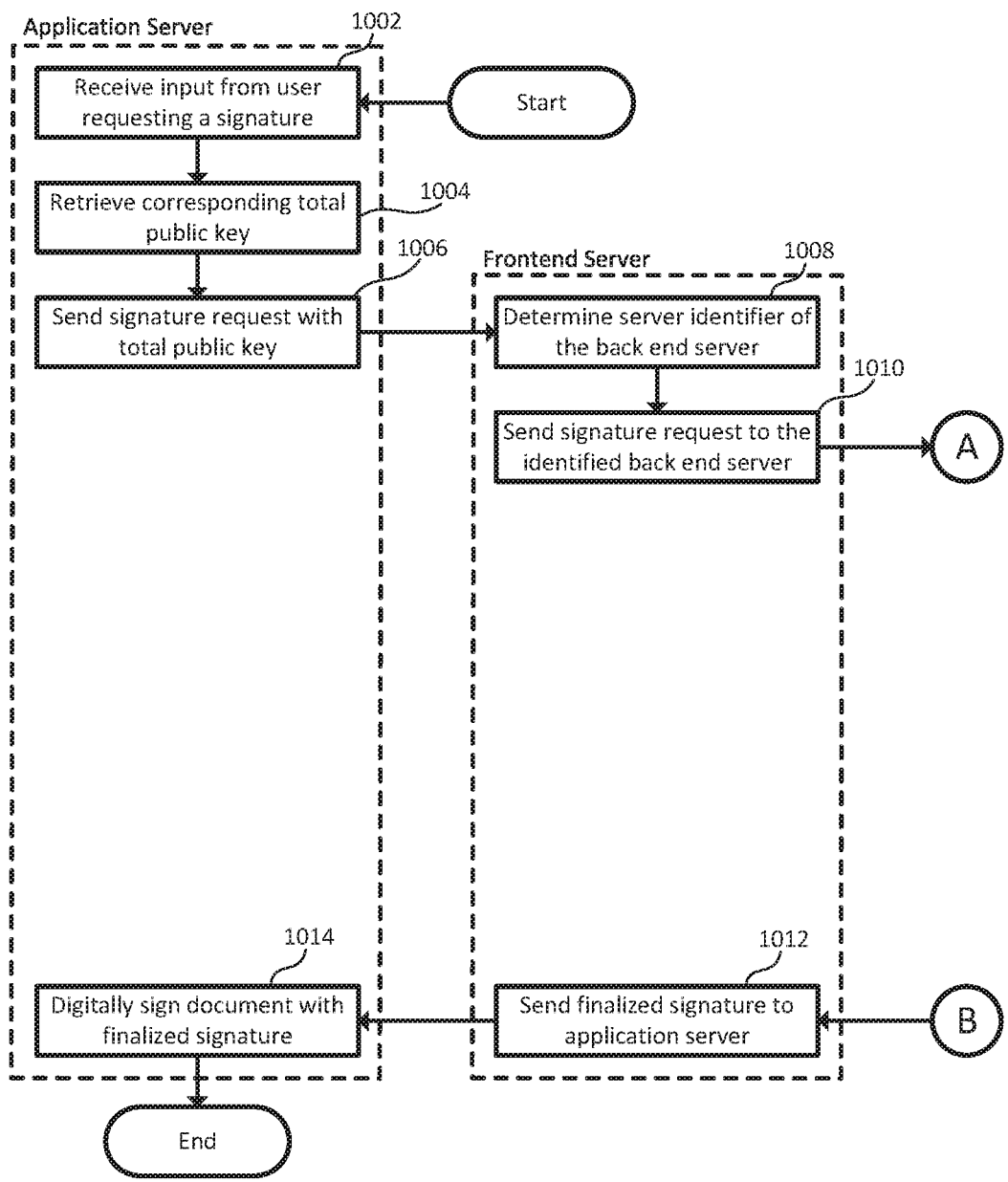
FIG. 10 is a flowchart of the a method to generate a signature for a digital document, which may be implemented by the systems of FIGS. 5, 6 and 7.

FIG. 10 is a flowchart of the a method to generate a signature for a digital document, which may be implemented by the system of FIGS. 5, 6, and 7. Initially, a block 1002, the application server 508 receives an input from the customer 506 that initiates the generation of a digital signature. For example, the customer 508 may provide credentials and click an "accept" button on a website to acknowledge their agreement to a privacy and data protection policy. At block 1004, the application server 508 retrieves the total public key 402 from associated with the customer 506 from the public key repository 514. At block 1006, the application server 508 sends the signature request 504 to the frontend server 510.

At block 1006, the frontend server 510 uses the identity extraction function ($f_{40}$) to extract the cryptographically embedded BESID 406 from the total public key 402 included in the signature request 504. At block 1008, the frontend server 510 forwards the signature request to the backend server 512 that corresponds to the extracted BESID 406. The method continues to block 1102 (FIG. 11A) when the backend server 512 is storing a private key associated with the customer 506. The method continues at block 1120 (FIG. 11B) when the backend server 512 does not store a private key associated with the customer 506.

At block 1008, the frontend server 510 receives the finalized signature 408 from the backend server 512 and forwards the finalized signature 408 to the application server 508.

At block 1010, the application server 508 digitally signs the digital document by appending the finalized signature 408 to it.

Figure 11A:
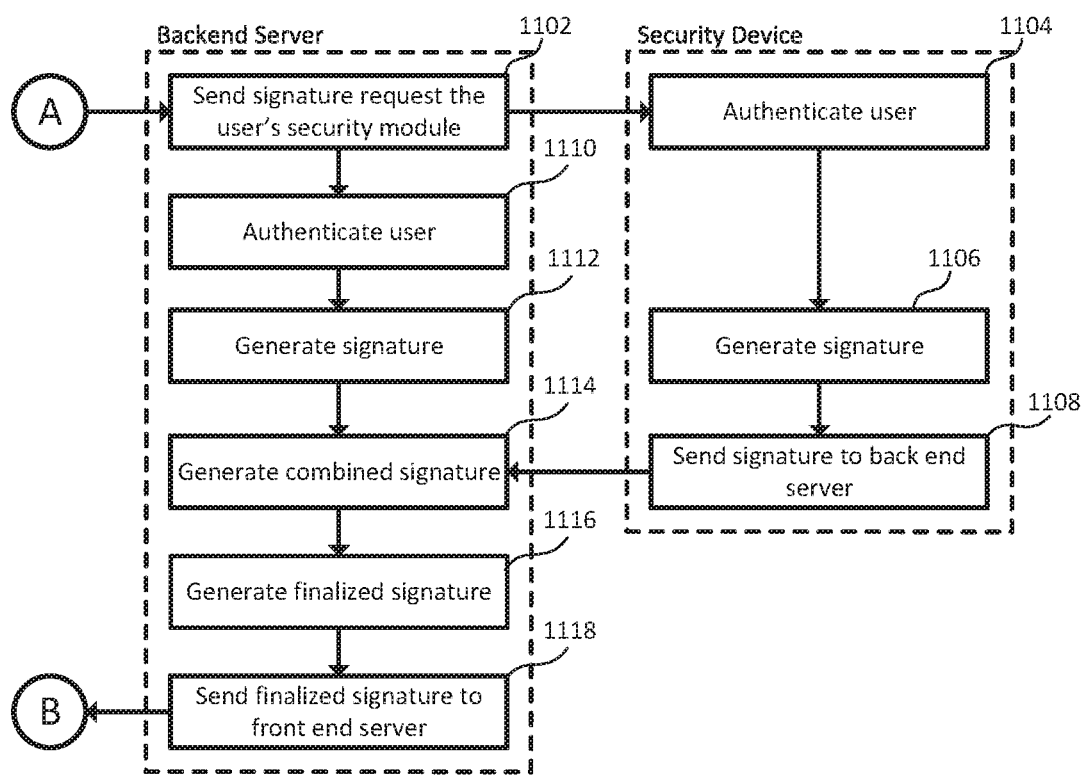
FIGS. 11A and 11B are flowcharts of methods to generate a signature for a digital documents which may be implemented by the system of FIGS. 5, 6, and 7.

FIG. 11A is a flowchart to generate a signature for a digital documents when a backend server 512 stores a private key for a customer 506, which may be implemented by the system of FIGS. 5, 6, and 7. At block 1102, the backend server 512 sends the signature request 504 to the security device 502. At block 1104, the security device 502 authenticates the customer 506. For example, the security device 502 may authenticate the customer 506 in response to receiving a finger print and/or a set of credentials. At block 1106, the security device 502 generates a first signature with its stored private key using the signing function ($f_3$). At block 1108, the security device 502 transmits the first signature to the backend server 512.

At block 1110, the backend server 512 authenticates the customer 506. In some examples, the backend server 512 may communicate with a security token 516 to receive credentials or other authentication tokens. For example, the security token 516 may have a finger print scanner to receive an input from the customer 506 and a wireless transceiver to determine whether the security token 516 is within a threshold distance of the security device 502 (e.g., using RSSI measurements, etc.). At block 1112, the backend server 512 generates a second signature using the signing function ($f_3$). At block 1114, the backend server 512 generates a combined signature (e.g., a composite signature using the composite signature function ($f_6$), or a splitkey signature using the splitkey combiner function ($f_{11}$), etc.). At block 1116, the backend server 512 generates a finalized signature using the finalizing function ($f_{30}$) based on the combined signature and the finalizing key 404 associated with the customer 506. At block 1118, the backend server 512 sends the finalized signature to the frontend server 510. The method continues at block 1012 (FIG. 10).

Figure 11B:
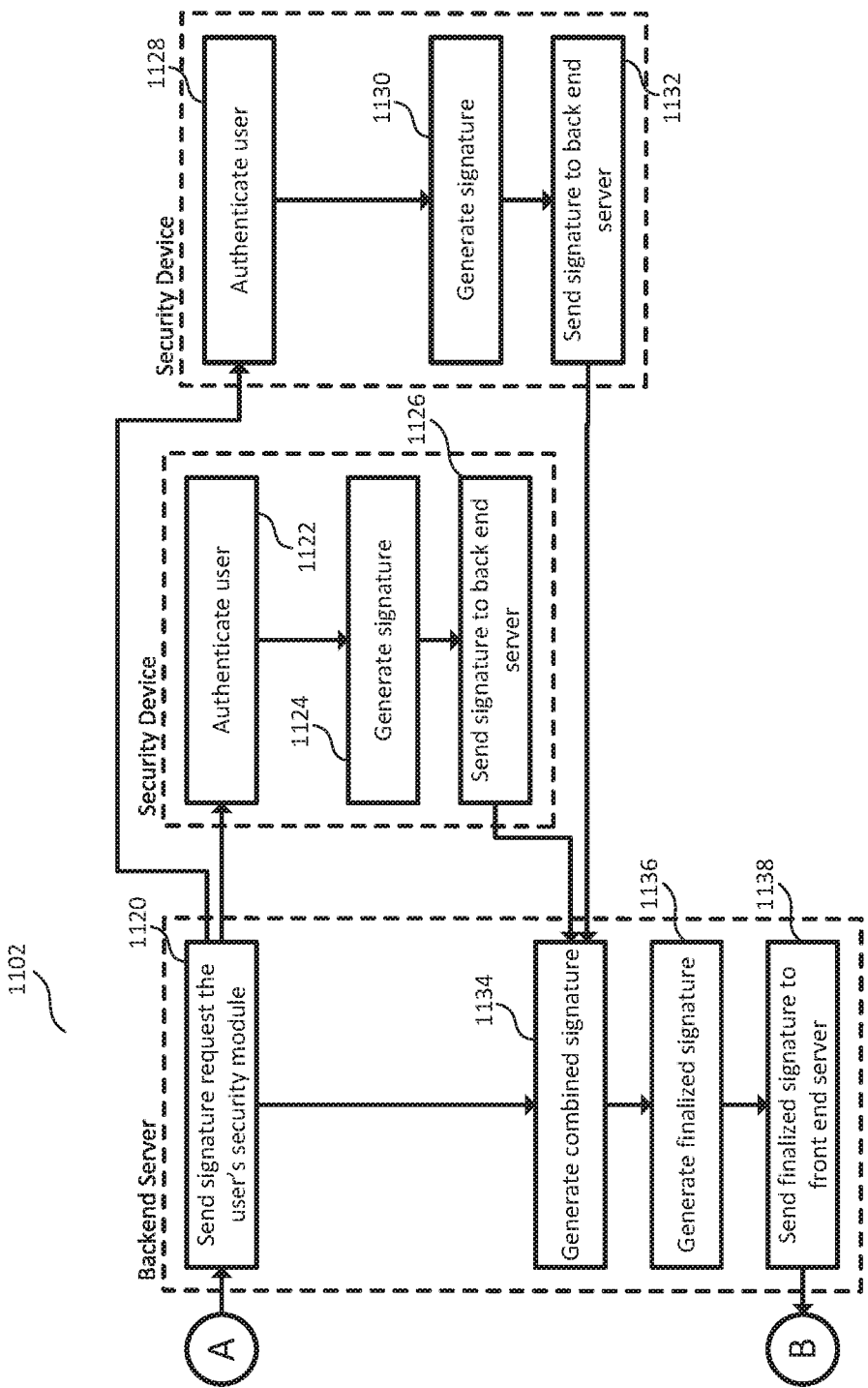

FIG. 11B is a flowchart to generate a signature for a digital documents when a backend server 512 does not store a private key for a customer 506, which may be implemented by the system of FIGS. 5, 6, and 7. At block 1120, the backend server 512 sends the signature request 504 to the security devices 502.

At block 1122, the first security device 502 authenticates the customer 506. For example, the first security device 502 may authenticate the customer 506 in response to receiving a finger print and/or a set of credentials. At block 1124, the first security device 503 generates a first signature with its stored private key using the signing function ($f_3$). At block 1126, the first security device 502 transmits the first signature to the backend server 512.

At block 1128, the second security device 502 authenticates the customer 506. At block 1130, the second security device 503 generates a second signature with its stored private key using the signing function ($f_3$). At block 1132, the second security device 502 transmits the second signature to the backend server 512.

At block 1134, the backend server 512 generates a combined signature (e.g., a composite signature using the composite signature function ($f_6$), or a splitkey signature using the splitkey combiner function ($f_{11}$), etc.). At block 1118, the backend server 512 generates a finalized signature using the finalizing function ($f_{30}$) based on the combined signature and the finalizing key 404 associated with the customer 506. At block 1136, the backend server 512 sends the finalized signature to the frontend server 510. The method continues at block 1012 (FIG. 10).

In this application, the use of disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The term "remote" means being geographically removed from and communicatively coupled via an internal or external network, such as an intranet or the Internet). The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system for generating a digital signature comprising:
a plurality of backend servers and a frontend server;
the frontend server configured to:
receive a signature request from a remote application server, the signature request including a total public key with a cryptographically embedded server identifier;
extract the cryptographically embedded server identifier from the total public key;
forward the signature request to the one of the plurality of backend servers that corresponds to the backend server identifier; and
wherein the one of the plurality of backend servers is configured to:
forward the signature request to a plurality of remote security devices associated with the total public key;
receive a first signature from each of the plurality of remote security devices;
generate a combined signature based on the first signatures;
generate a finalized signature based on the combined signature and a finalizing key, the finalizing key being cryptographically generated based on the backend server identifier; and
forward the finalized signature to the frontend server;
wherein the frontend server is further configured to forward the finalized signature to the application server.

2. The system of claim 1, wherein combined signature is generated using a composite key scheme.

3. The system of claim 1, wherein the combined signature is generated using a split key scheme.

4. The system of claim 1, wherein the one of the plurality of backend servers is configured to initially register the plurality of remote security devices by:
associating the plurality of remote security devices with a particular user;
generating a combined public key based on first public keys received from the plurality of remote security devices;
generating the total public key by cryptographically embedding the server identifier into the combined public key; and
associating the total public key with the particular user.

5. The system of claim 4, wherein the total public key and the finalizing key are generated using a prime number selected based on the server identifier and the combined public key.

6. A system for generating a digital signature comprising:
a plurality of backend servers and a frontend server;
the frontend server configured to:
receive a signature request from a remote application server, the signature request including a total public key with a cryptographically embedded server identifier;
extract the cryptographically embedded server identifier from the total public key; and
forward the signature request to the one of the plurality of backend servers that corresponds to the server identifier; and
wherein the one of the plurality of backend servers are configured to:
forward the signature request to a remote security device associated with the total public key;
receive a first signature from the remote security device; generate a second signature in response to authenticating an identity of a user;
generate a combined signature based on the first signature and the second signature;
generate the third signature based on the combined signature and a finalizing key, the finalizing key being cryptographically generated based on the backend server identifier; and
forward the third signature to the frontend server;
wherein the frontend server is further configured to forward the third signature to the application server.

7. The system of claim 6, wherein the combined signature is generated using a composite key scheme.

8. The system of claim 6, wherein the combined signature is generated using a split key scheme.

9. The system of claim 6, wherein the one of the plurality of backend servers is configured to initially register the remote security device by:
associating the remote security device with a particular user;
generating a combined public key based on a first public key received from the remote security device and a second public key generated by the backend server;
generating the total public key by cryptographically embedding the server identifier into the combined public key; and
associating the total public key with the particular user.

10. The system of claim 9, wherein the total public key and the finalizing key are generated using a prime number selected based on the backend server identifier and the combined public key.

11. A method for generating a digital signature comprising:
receiving, at a frontend server, a signature request from a remote application server, the signature request including a total public key with a cryptographically embedded server identifier;
extracting, at the frontend server, the cryptographically embedded server identifier from the total public key;
selecting, by the frontend server, one of a plurality of backend servers that corresponds to the server identifier
forwarding, by the frontend server, the signature request the selected backend server;
obtaining, by the selected backend server, a first signature and a second signature;
generating, by the selected backend server, a combined signature based on the first signature and second signature;
generating, by the selected backend server, a finalized signature based on the combined signature and a finalizing key, the finalizing key being cryptographically generated based on the server identifier;
forwarding, by the selected backend server, the finalized signature to the frontend server; and
forwarding, by the frontend server, the finalized signature to the remote application server to be appended to a digital document.

12. The method of claim 11, wherein obtaining, by the selected backend server, the first signature and the second signature includes:
identifying a first remote security device and a second remote security device based on the total public key;

forwarding the signature request to the first remote security device and the second remote security device; and receiving the first signature from the first remote security device and the second signature from the second remote security device.

13. The method of claim 11, wherein obtaining, by the backend server, the first signature and the second signature includes:

identifying a remote security device based on the total public key;

forwarding the signature request to the remote security device;

receiving the first signature from the remote security device; and generating the second signature using a private key associated with the total public key after authenticating an identity of a user associated with the total public key.

14. The method of claim 11, wherein combined signature is generated using a composite key scheme.

15. The method of claim 11, wherein the total public key and the finalizing key are generated using a prime number selected based on the server identifier and a combined public key.

* * * * *